United States Patent [19]

Gauss

[11] Patent Number: 4,880,202

[45] Date of Patent: Nov. 14, 1989

[54] COMPUTER PRINTER STAND

[75] Inventor: Edward J. Gauss, Lincroft, N.J.

[73] Assignees: American Telephone and Telegraph Company, New York, N.Y.; AT&T Bell Laboratories, Murray Hill, N.J.

[21] Appl. No.: 224,050

[22] Filed: Jul. 25, 1988

[51] Int. Cl.[4] ............................................. F16M 13/00
[52] U.S. Cl. ...................................... 248/676; 211/13; 248/127; 248/398; 248/918; 312/208
[58] Field of Search ............... 248/398, 676, 127, 678, 248/176, 174, 133, 152, 1 B; 211/13; 400/613.2, 613.3; 312/208

[56] References Cited

U.S. PATENT DOCUMENTS

| | | | |
|---|---|---|---|
| 3,885,698 | 5/1975 | Lebel et al. | 248/133 X |
| 4,496,124 | 1/1985 | Cole | 248/152 X |
| 4,522,521 | 6/1985 | Scott | 400/613.2 X |
| 4,570,802 | 2/1986 | Murphy | 248/176 X |
| 4,615,502 | 10/1986 | McLaughlin | 248/176 |
| 4,632,345 | 12/1986 | Barley | 248/676 X |
| 4,707,156 | 11/1987 | Clark | 248/676 X |
| 4,722,506 | 2/1988 | Chang | 248/676 |
| 4,755,010 | 7/1988 | Wilson et al. | 211/45 X |

FOREIGN PATENT DOCUMENTS 368526 3/1932 United Kingdom ................ 312/208

OTHER PUBLICATIONS

Devoke Data Products, Devoke Co., Santa Clara, Calif., Fall Winter 1984, p. 22, Box C-44.
Inmac, 42B Edition, Feb. 1984, Santa Clara, Calif., p. 8, Box C-44.
MISCO Computer Supplies and Accessories, Fall/Winter 1984, p. 52.

Primary Examiner—Ramon S. Britts
Assistant Examiner—David L. Talbott
Attorney, Agent, or Firm—Richard B. Havill

[57] ABSTRACT

A computer printer stand has a rear surface positioned at an obtuse angle with respect to the bottom surface of the computer printer stand so that a bottom-feeding computer printer and the printer stand can be tipped up from the front into a stable position in which they remain standing on the rear surface of the computer printer stand. In the tipped up position, the bottom feed slot is exposed for ease of inserting the beginning of a new stack of paper.

1 Claim, 2 Drawing Sheets

COMPUTER PRINTER STAND

This invention relates to a computer printer stand for a bottom paper feed printer.

BACKGROUND OF THE INVENTION

Currently desk top computer printers are designed to feed automatically into the printer a stack of fanfold computer paper. A slot through which the computer paper is fed into the printer may be located in the top, the bottom or the back of the printer. For a relatively higher speed desk top computer printer, the computer paper is fed in through a slot oriented across from side-to-side in the bottom of the printer.

Since the computer paper is fed into the computer through the slot in the bottom of the computer printer, a stack of fanfold computer paper must be located below the computer printer. Computer printer stands have been designed to hold the computer printer high enough above the surface of a desk or of a table so that a stack of fanfold computer paper can be located directly under the computer printer. The continuous strip of computer paper from the stack feeds readily through the slot into the bottom of the computer printer.

Typically a computer printer stand is designed for the stand to rest full time on its own bottom surface which may be defined by the bottom edges or by the feet of the printer stand. A problem arises with this computer stand when a new stack of paper is initially inserted into the slot in the bottom of the computer printer. The computer operator must use one hand to hold the computer printer and the stand off of the desk surface for gaining access to the feed slot into the bottom of the computer printer. Only one hand remains free to manage the task of inserting the beginning of the computer paper into the printer. With only one hand free to manipulate the paper, the paper often is misaligned and subsequently will jam during operation.

One known computer printer stand has a front surface which is positioned at an obtuse angle from the bottom surface of the computer printer stand so that the computer printer and the computer printer stand can be tipped up from the back. They remain standing stably on the front surface of the computer printer stand. This computer printer stand enables the computer operator to use a surface over the top of the computer printer for holding one or more sheets of paper with text to be copied. When the stand is tipped toward the front, the slot in the bottom of the computer printer is exposed but it is exposed in a direction which is inconveniently positioned away from the computer operator. Although the feed slot is exposed, the computer operator is at a disadvantage when inserting the beginning of a stack of computer paper into the printer. Again the paper may be misaligned causing the paper to jam during subsequent operation.

SUMMARY OF THE INVENTION

These problems are solved by a computer printer stand that has a rear surface which is positioned at an obtuse angle with respect to the bottom surface of the computer printer stand so that the computer printer and the computer printer stand can be tipped up from the front. They remain standing in a stable position on the rear surface of the computer printer stand.

An advantage of this improved computer printer stand is that the slot through the bottom of the computer printer is exposed toward the computer operator when the computer printer and its stand are tipped up from the front. Since the computer printer and the computer printer stand remain standing in a stable position, the operator has two hands free for inserting the beginning of the strip of fanfold computer paper and can see the alignment of paper holes and pins at the top of the printer. The paper can be aligned readily to avoid a jam during subsequent operation.

BRIEF DESCRIPTION OF THE DRAWING

This invention may be better understood by reading the subsequent detailed description with reference to the appended drawing wherein.

DETAILED DESCRIPTION

Figure 1:
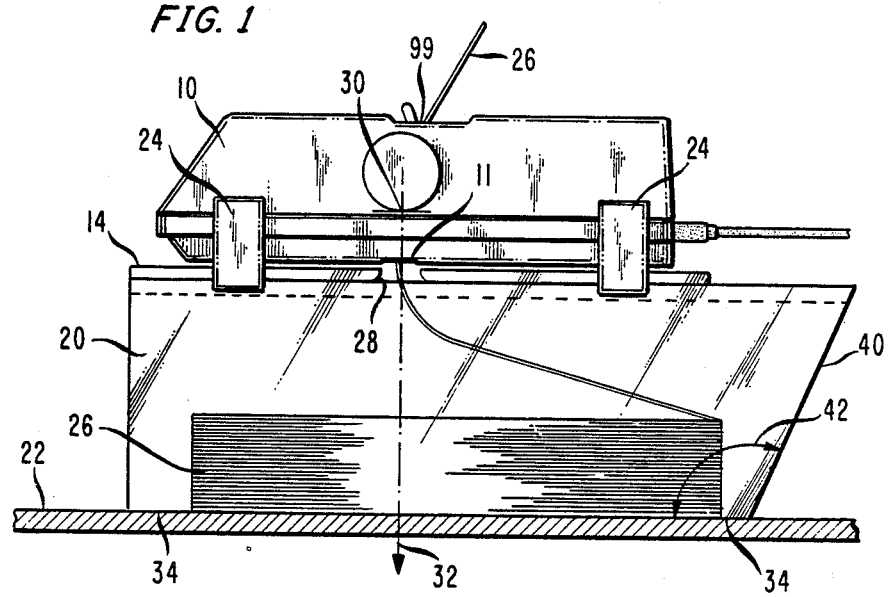
FIG. 1 is a side view of a desk top computer printer and a computer printer stand arranged in a normal position firmly standing on the bottom surface of the computer printer stand.

Referring now to FIG. 1, there is shown a desk top computer printer 10, which includes a paper feed slot 11 oriented from side-to-side across the bottom. The computer printer 10 is seated on the top surface 14 of a computer printer stand 20 which holds the computer printer 10 above a desk, or table, surface 22.

Fastners 24 may be screws, bolts, clips, clamps or other items for holding or fastening the computer printer 10 in place on top surface 14 of the computer printer stand 20.

A stack of fanfold computer printer paper 26 rests on the desk surface 22. The beginning, or first, sheet of the stack of paper 26 is fed through a side-to-side slot 28 in the upper surface 14 of the computer printer stand 20 and into the paper feed slot 11 in the printer 10.

As shown in FIG. 1, the printer stand 20, is positioned in its normal down position for printing. As the lines of text are printed on the sheet being fed up through the printer 10, the rest of the sheet or a following sheet is lifted from the top of the stack of fanfold computer printer paper 26.

A heavy cross 30 represents the center of gravity of the combination of the computer printer 10 and the printer stand 20. An arrow 32 represents the pull of gravity on the center of gravity 30. Note that the center of gravity 30 is pulled down through and near the center of the bottom surface 34 of the printer stand 20 when it is in its normal down position for printer operation. During regular operation, the combination of the printer 10 and the printer stand 20 will rest firmly, or stably, on the bottom surface 34 of the printer stand 20 until the stack of paper is exhausted. At such a time, the beginning of a new stack of paper must be inserted through the feed slot 11 in the bottom of the printer 10.

Figure 2:
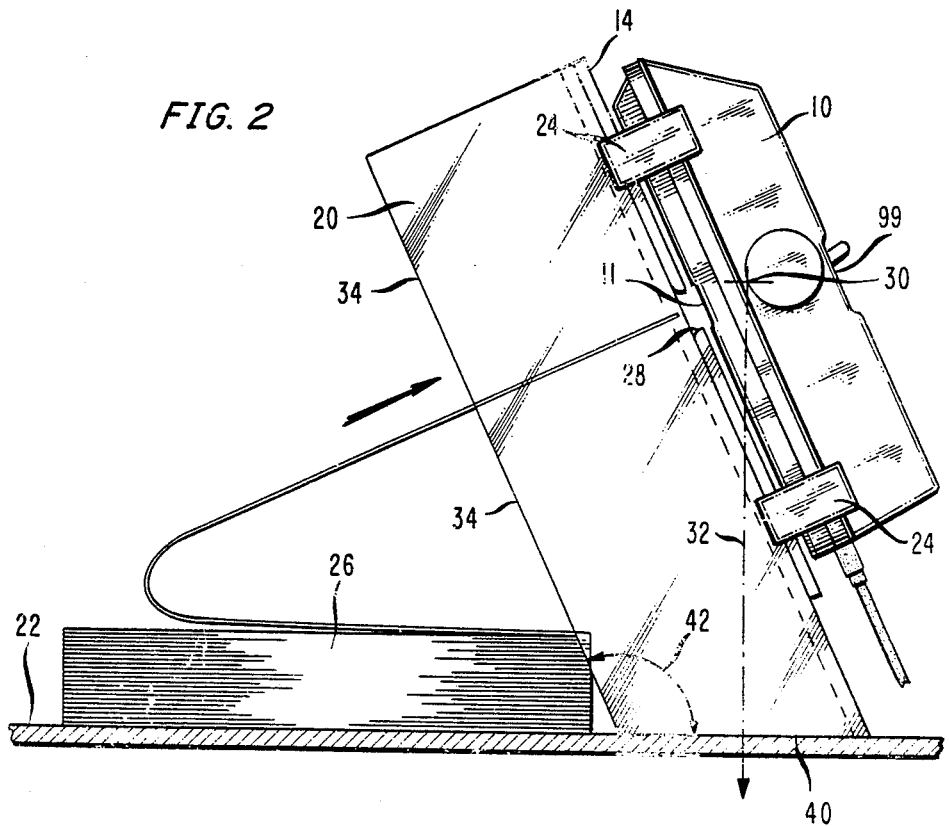
FIG. 2 is a side view of the desk top computer printer and the computer printer stand of FIG. 1 tipped up from the front firmly standing on the rear surface of the computer printer stand.

Referring now to FIG. 2, the front of the combination of the computer printer 10 and the printer stand 20 is tipped up from the desk surface 22 and is repositioned in another stable position resting on the rear surface 40 of the printer stand 20. The rear surface 40 is positioned at the obtuse angle 42 with respect to the bottom surface 34 of the printer stand 20. The angle 42 is selected from a range of angles that assure the center of gravity 30 is positioned along a line normal to and directly above the rear surface 40 while the combination is tipped up from the front. It is best when the center of gravity is located directly above a point near the center of the rear surface 40 while the combination is tipped up. By being so arranged, the combination will rest in a stable position so that the operator has two hands free for feeding the first sheet of printer paper 26 into the feed slot 11 of the printer 10. It is noted that from the front edge of the combination the operator has a clear view of both the stack of printer paper 26 and the feed slot 11 of the printer 10. The operator also can see the printer carriage 99 and the alignment of paper holes with the pins from the top.

Figure 3:
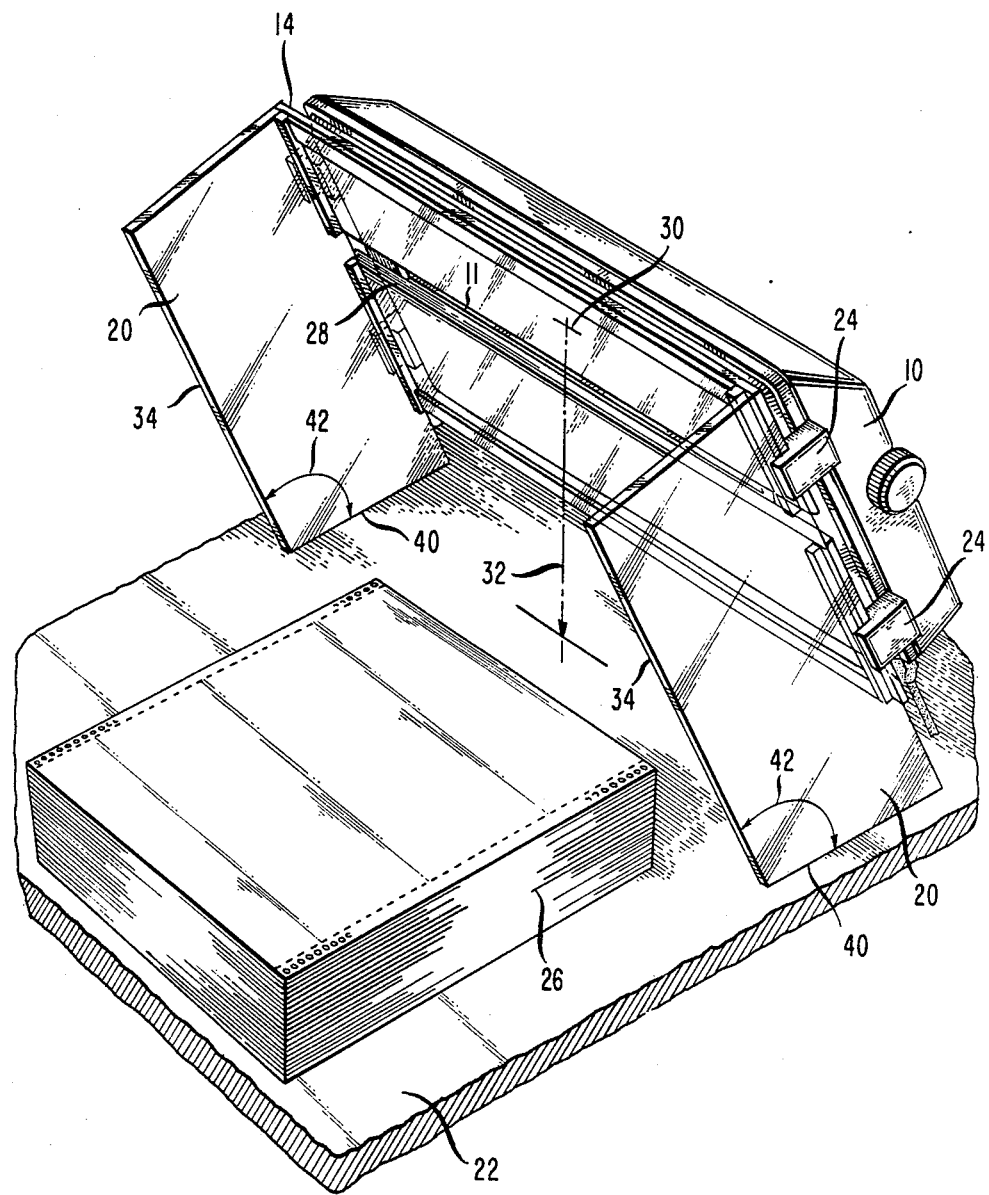
FIG. 3 is a perspective view of a desk top computer printer and a computer printer stand tipped up from the front exposing both a stack of fanfold paper and a bottom feed slot into the printer.

Referring now to FIG. 3, the computer printer 10 and the computer printer stand 20 are shown in a tipped up position in perspective. The printer stand 20 may be fabricated from wood, plastic, metal or any other material having sufficient strength, durability and workability. Side, rear, and top surfaces of the stand 20 may be fabricated from either a flat material or a wire form. The bottom surface 34 of the stand 20 is open so that the stack of paper 26 fits conveniently between the sides of the stand 20 and so that the feed slot 11 is sufficiently exposed for ease of feeding the initial sheet of paper when the combination is tipped up into its stable position resting on the rear surface 40 of the printer stand 20.

The described computer printer stand arrangement and other arrangements made obvious in view there of are considered to be within the scope of the appended claims.

I claim:

1. A combination comprising a computer printer having a bottom paper feed slot, a printer stand having a paper feed slot in a top surface, means for fixing the computer printer to the top surface of the printer stand, the printer stand having a bottom surface positioned so that the center of gravity of the computer printer and the printer stand is directly over the bottom surface when the computer printer and the printer stand are in a normal position for printer operation, and the printer stand having a rear surface positioned so that the center of gravity of the computer printer and the printer stand is directly over the rear surface when the computer printer and the printer stand are raised up from the front into a position for loading paper into the bottom paper feed slot.

* * * * *